(12) United States Patent
Schoeggl

(10) Patent No.: US 7,668,706 B2
(45) Date of Patent: Feb. 23, 2010

(54) METHOD FOR STIMULATING THE DRIVING BEHAVIOR OF VEHICLES

(75) Inventor: Peter Schoeggl, Seiersberg (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 11/703,104

(22) Filed: Feb. 7, 2007

(65) Prior Publication Data

US 2007/0156376 A1 Jul. 5, 2007

Related U.S. Application Data

(63) Continuation of application No. 10/619,547, filed on Jul. 16, 2003, now abandoned.

(30) Foreign Application Priority Data

Jul. 19, 2002 (AT) .............................. A 1103/2002

(51) Int. Cl.
*G06G 7/48* (2006.01)
(52) U.S. Cl. ......................................................... 703/8
(58) Field of Classification Search ....................... 703/8
See application file for complete search history.

(56) References Cited

U.S. PATENT DOCUMENTS

| | | | | |
|---|---|---|---|---|
| 3,962,914 | A * | 6/1976 | Lutz ............................. | 73/125 |
| 4,680,959 | A * | 7/1987 | Henry et al. ................... | 73/117 |
| 5,986,545 | A * | 11/1999 | Sanada et al. ............... | 340/439 |
| 6,079,258 | A * | 6/2000 | List et al. .................... | 73/117.3 |
| 6,516,287 | B1 * | 2/2003 | Freitag ......................... | 702/173 |
| 6,598,467 | B1 * | 7/2003 | Schoggl et al. ............. | 73/117.3 |
| 6,813,938 | B2 * | 11/2004 | Schwendemann ............ | 73/146 |
| 2003/0004615 | A1 * | 1/2003 | Hagelin ......................... | 701/1 |
| 2003/0014230 | A1 * | 1/2003 | Hagelin ......................... | 703/8 |
| 2003/0191573 | A1 * | 10/2003 | Beyer et al. .................... | 701/70 |

\* cited by examiner

*Primary Examiner*—Paul L Rodriguez
*Assistant Examiner*—Eunhee Kim
(74) *Attorney, Agent, or Firm*—Dykema Gossett PLLC

(57) ABSTRACT

The invention relates to a method for simulating the driving behavior of vehicles on a test stand in which the engine of the vehicle is coupled on the test stand to an electronically controllable braking apparatus and a first simulation model calculates simulation values of variables which are representative of the driving state of the vehicle in that the reaction of the vehicle to the behavior of the engine and the values of the variables as determined immediately prior thereto are calculated, with at least one evaluation variable w being calculated on the basis of the values measured on the test stand for measurable variables and engine torque M and the values calculated therefrom with the simulation model for non-measurable variables. An improved simulation is achieved in such a way that in a further simulation model higher-frequency changes are calculated from variables which are measurable per se and are considered in the calculation of the evaluation variable by superimposing with the actual measured values or that in the simulation model higher-frequency changes are calculated from variables which are measurable per se and are considered in the calculation of the evaluation variable w by superimposing with the actual measured values.

10 Claims, 2 Drawing Sheets

METHOD FOR STIMULATING THE DRIVING BEHAVIOR OF VEHICLES

CROSS-REFERENCE TO RELATED APPLICATION

This application is a continuation of application Ser. No. 10/619,547, filed Jul. 16, 2003, now abandoned.

BACKGROUND OF THE INVENTION

The invention relates to a method for simulating the driving behavior of vehicles on a test stand in which the engine of the vehicle is coupled on the test stand to an electronically controllable braking apparatus and a simulation model calculates simulation values of variables which are representative of the driving state of the vehicle in that the reaction of the vehicle to the behavior of the engine and the values of the variables as determined immediately prior thereto are calculated, with at least one evaluation variable being determined on the basis of the values measured on the test stand for measurable variables such as engine speed and engine torque and the values calculated therefrom with the simulation model for non-measurable variables such as the vehicle speed or the like.

DESCRIPTION OF THE PRIOR ART

It is known to simulate the behavior of motor vehicles on test stands because in this way a substantially quicker, more efficient and cheaper examination of the behavior of the motor vehicle is enabled than in tests on the real vehicle on the road. Since only very few variables can be measured on the test stand directly, namely the engine speed and the engine torque, it is necessary to calculate the other, non-measurable variables by way of a simulation model. The simulation model includes the relevant features of the simulated motor vehicle, namely mass, air resistance, transmission ratio in the drive train, elasticities in the drive train and many more. With a carefully prepared simulation model which is calibrated on the basis of a real vehicle it is possible to obtain reliable statements which are close to reality on the behavior of the real vehicle under various conditions. The result of the tests on the test stand shall be designated in the description below as evaluation variable. Depending on the specific problem to be solved on the test stand, a large number of evaluation variables can be determined. Such evaluation variables are for example the fuel consumption in certain situations or in certain driving cycles, certain types of exhaust gas emissions or the amplitude of bucking oscillations by performing certain driving maneuvers. It is also possible to use more complex evaluation variables such as drivability indexes or the like.

It has now been seen that even in the event of the best possible configuration of the simulation model for the vehicle there isn't a possibility in all cases to determine an evaluation variable in such a precise and reliable manner that a true statement is possible on the simulated vehicle. In particular, this relates to transient phenomena with higher frequencies, which is caused by the fact that the available test stands show a higher inertia than the drive strand of a motor vehicle.

SUMMARY OF THE INVENTION

It is the object of the present invention to avoid this disadvantage and to provide a method with which suddenly occurring phenomena or such of higher frequency can be reproduced accordingly.

In accordance with the invention, it is provided in a first embodiment of the invention that in a further simulation model higher-frequency changes are calculated from variables which are measurable per se and are considered in the calculation of the evaluation variable by superimposing with the actual measured values. The principal idea of this embodiment is that the test stand per se is operated in a conventional fashion, but that an additional simulation model is used for the calculation of the evaluation variable in which the actually measurable variables are superimposed with the higher-frequency fluctuations which cannot be duplicated in reality. One field of application of the invention is that impacts in the drive train which are caused by impact-like moment loads can be reproduced accordingly, and this despite the fact that the test stand is not capable due to its lack of dynamics to duplicate the associated fluctuations in the engine speed and the engine torque. In the evaluation, however, the effects of a so-called load strike will be considered accordingly. Derived variables such as the inside noise can be considered accordingly.

In an especially favorable embodiment of the invention it is provided that the engine is controlled by an electronic control device which corresponds to that of the real vehicle and that the control device is supplied with the values as measured on the test stand for measurable variables and with the values calculated in the first simulation model for non-measurable variables. It is especially advantageous when the control device is adaptive and that for the adaptation the evaluation variable is used. Modern engines are controlled by such an electronic control device which works on the basis of engine characteristics maps and intervenes in many ways in the management of the engine in that the injection time and the injection quantity are determined for example. In the case of so-called adaptive control devices, the used engine characteristics maps are not determined in an unchangeable way. Instead, they are changed slowly in the progress of time depending on various evaluation variables in order to compensate changes by wear and tear for example. It has been seen that for the running operation of the control device it is sufficient to use the original values of the measured variables and the other values from the first simulation model. For the adaptation of the control device it is very advantageous to also consider higher-frequency fluctuations which are obtained in the inventive manner in the further simulation model by superimposition. The adaptation of the engine control device can be performed in such a way that after the occurrence of several load strikes there is a change in the engine characteristics map in such a way that such a phenomenon is prevented in future.

It is provided in a further alternative embodiment of the method in accordance with the invention that higher-frequency changes of variables which are actually measurable are calculated in the simulation model and are considered in superimposition with the actual measured values in calculating the evaluation variable. In contrast to the embodiment as described above, the values of the variables enriched with the higher-frequency changes are used in this case too for controlling the test stand, so that a simplification of the configuration is possible. The fact is used in this embodiment that the test stand will filter out the higher-frequency parts practically automatically due to its inertia, so that interference will not occur or only to a low extent. In order to further reduce the likelihood of such a phenomenon, it may be provided that the values of the variables used for the control of the test stand are subjected to a low-pass filtering.

The present invention further relates to a test stand for simulating the driving behavior of vehicles, with a braking apparatus to which the engine of the vehicle is coupled, with measuring devices for measurable variables such as engine speed and engine torque, and with an electronic test stand control device for controlling the braking apparatus in which a first simulation model is stored which calculates simulation values of variables which are representative of the driving state of the vehicle, such that the reaction of the vehicle to the behavior of the motor and the immediately prior determined values of the variables are calculated, with an evaluation unit being provided which on the basis of the values measured on the test stand and the values for non-measurable variables such as vehicle speed or the like as calculated therefrom with the simulation model calculates at least one evaluation variable.

It is provided for in accordance with the invention that a superimposition unit is provided in which a further simulation model is stored which calculates higher-frequency changes of variables which are measurable per se and superimposes these to the actual measured-values in the calculation of the evaluation variable.

According to an embodiment, the superimposition unit is adaptive and is used directly for triggering the electronic test stand control device and/or the braking apparatus.

The method in accordance with the invention and the apparatus in accordance with the invention can also be used in order to consider higher-frequency fluctuations which are caused by slip control programs or the like which are installed in modern motor vehicles.

An important principal idea of the invention is that in contrast to known methods and apparatuses, the rigid linkage of the engine speed with the speed of the vehicle chassis is eliminated and thus an additional degree of freedom is introduced in the system which is covered by the further simulation model. In this way it is possible to also reproduce and consider high-frequency phenomena accordingly, which due to the inertia of the test stand could otherwise not be represented.

BRIEF DESCRIPTION OF THE DRAWINGS

The invention is now explained in closer detail by reference to the embodiments shown in the drawings, wherein.

DETAILED DESCRIPTION OF THE PREFERRED EMBODIMENTS

Figure 1:
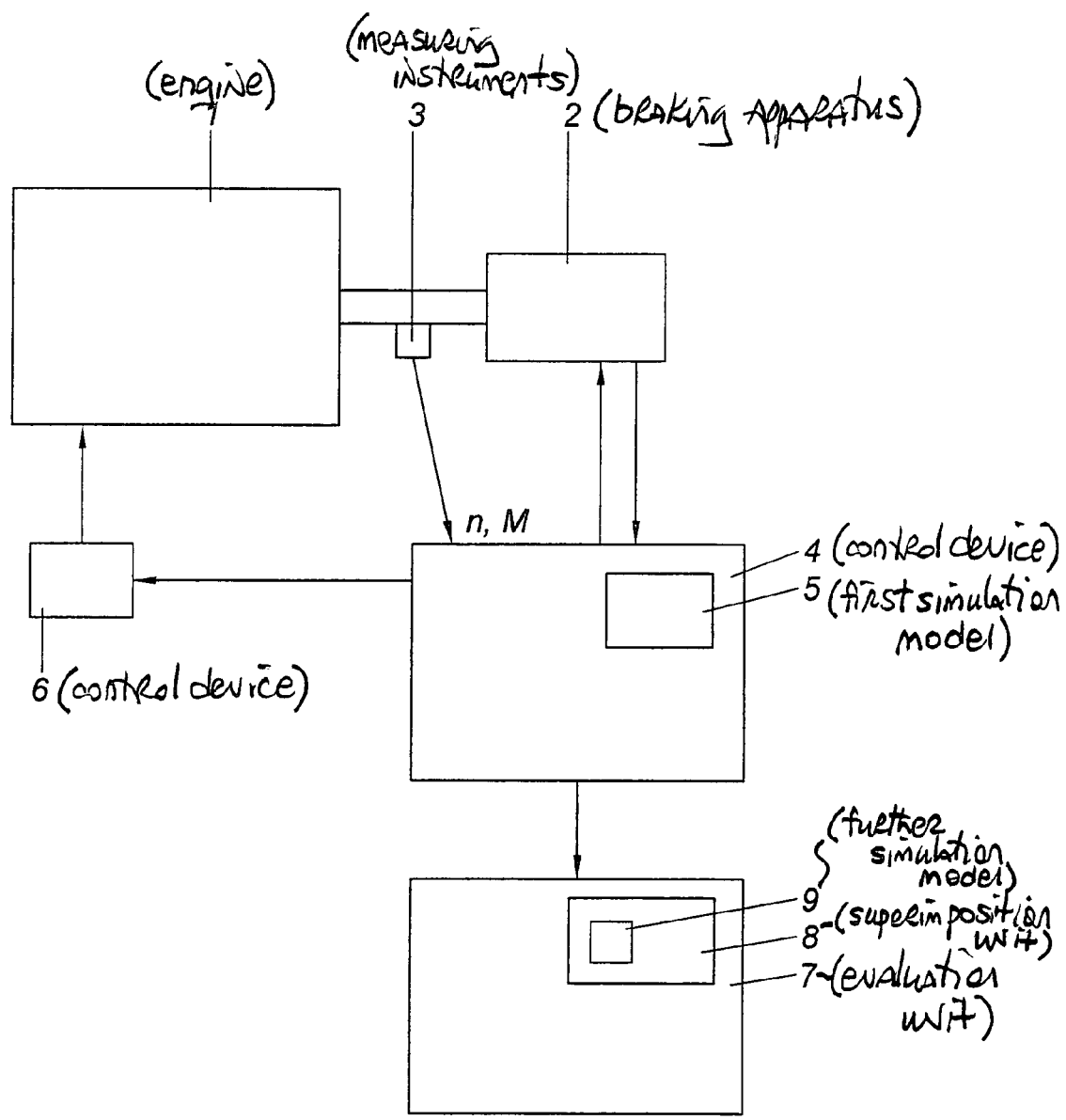
FIG. 1 shows a first embodiment of the invention in a schematic block diagram.

The block diagram of FIG. 1 shows an engine 1 which is configured as an internal combustion engine and is connected on a test stand to an electric braking apparatus 2. The engine speed n and the engine torque M is measured on the engine shaft via measuring instruments 3. A test stand control device 4 is used for controlling the test stand in such a way that the engine speed n and the engine torque M correspond to the highest possible extent to the respective values. on a real vehicle under the simulated conditions. For this purpose, a simulation model 5 is provided which is part of a test stand control device 4 and is installed in the same as a software. The test stand control device 4 is in connection in a bidirectional manner with the braking apparatus 2 and is supplied with respective measured values by the measuring instruments 3. The first simulation model 5 can consist of partial modes such as a model of the drive train, a model of the suspension, an aerodynamic model, etc. All variables which are necessary for the operation of the simulation are calculated by the test stand control device 4 by using the first simulation model 5. The variables which cannot be measured directly, such as vehicle speed v, are calculated in order to enter the same into a control device 6 which controls the motor 1. This control device 6 concerns the same control device as is also provided in the real vehicle for controlling the engine 1. If necessary, the test stand control device 4 must also calculate and simulate all sensor signals such as the steering angle sensor or the inclination sensors because they are otherwise not available on the test stand. Furthermore, the test stand software 4 outputs measured values or calculated values to an evaluation unit 7 which calculates the values which are required as a result of the simulation. A part of the evaluation unit 7 is a superimposition unit 8 in which the simulated speed $n_{sim}$ is calculated according to the following equation 1 from the measured speed $n_m$:

$$n_{sim}=n_m+\Delta n \quad (1)$$

The simulated engine torque $M_{sim}$ is calculated in an analogous way according to the following formula 2:

$$M_{sim}=M_m+\Delta M \quad (2)$$

$\Delta n$ and $\Delta M$ concern the calculated higher-frequency shares with a frequency of more than 8 Hz for example. When calibrating the superimposition unit 8 it is necessary to perform the calculation of $\Delta n$ and $\Delta M$ in such a way that the lower cut-off frequency is equal to the upper cut-off frequency of the test stand. A part of the superimposition unit 8 is a further simulation model 9 which is used for calculating these values $\Delta n$ and $\Delta M$.

Figure 2:
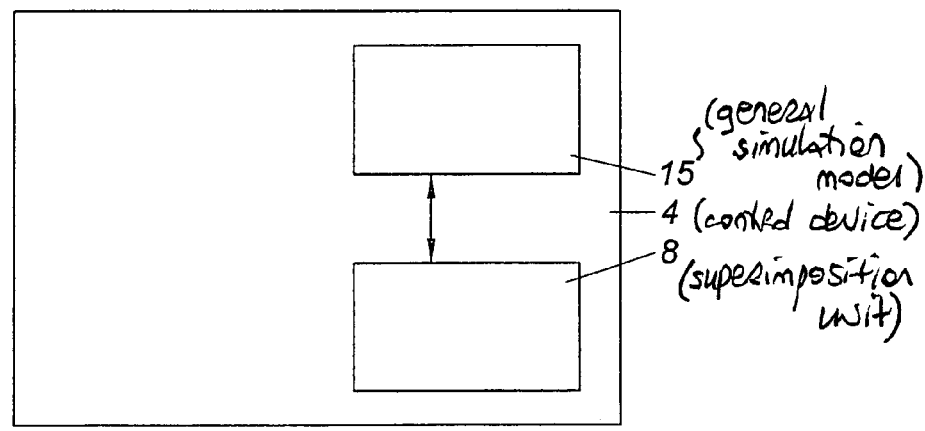
FIG. 2 shows a detail of a further embodiment of the invention.

In the embodiment of FIG. 2, a general simulation model 15 is contained in the test stand control device 4. This simulation model 15 interacts with a superimposition unit 8 which calculates the higher-frequency shares of the speed and the moment and returns them to the simulation model 15.

Figure 3:
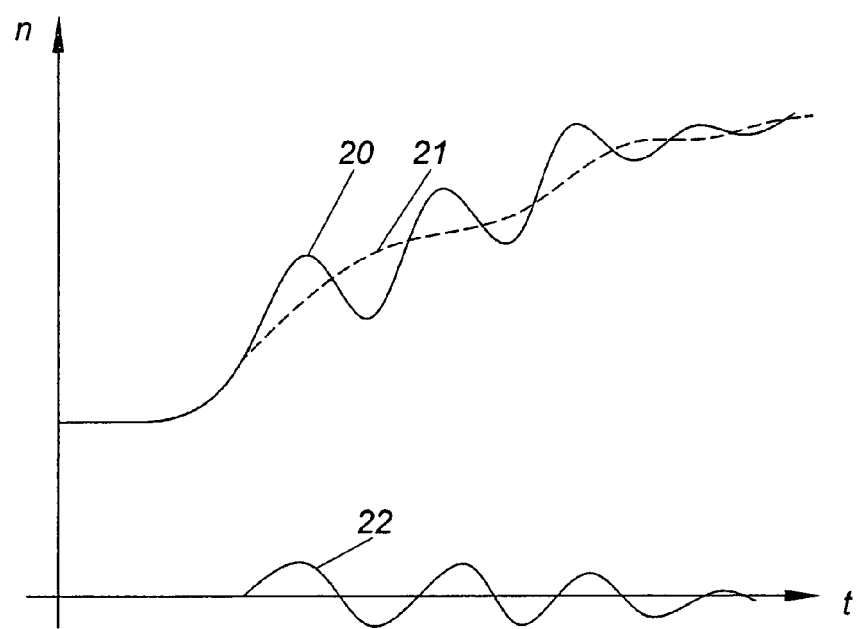
FIG. 3 shows a diagram which compares the progress of the engine speed as measured on the test stand with the progress of the rotational speed as calculated in the superimposition unit.

FIG. 3 shows in a diagram the engine speed n over the time t with an unbroken line 20. The broken line 21 represents the measured value $n_m$ which is determined by the measuring instruments 3. $\Delta n$ is calculated in the simulation model 9 of the superimposition unit 8, which is represented by the line 22. $n_{sim}$ according to curve 20 is obtained by adding $n_m$ and $\Delta n$.

What is claimed is:

1. A test stand for simulating driving behavior of vehicles, with a braking apparatus to which an engine of the vehicle is coupled, with measuring devices for measurable variables and engine torque M, and with an electronic test stand control device for controlling the braking apparatus in which a first simulation model is stored which calculates simulation values of variables which are representative of the driving state of vehicles, such that a reaction of the vehicle to the behavior of the engine and the values of the variables determined prior thereto are calculated, with an evaluation unit being provided which on the basis of the values measured on the test stand and the values for non-measurable variables as calculated therefrom with the simulation model calculates at least one evaluation variable w, wherein a superimposition unit is provided in which a further simulation model is stored which calculates higher-frequency changes in variables n, M which are measurable and superimposes the changes on the actual measured values in calculating the evaluation variable w.

2. The test stand according to claim 1, wherein the superimposition unit is adaptive and is used directly for triggering at least one of the electronic test stand device and the braking apparatus.

3. The test stand according to claim 1, wherein the superimposition unit is provided in the evaluation unit.

4. The test stand according to claim 1, wherein the superimposition unit is provided in the test stand control device.

5. The test stand according to claim 1, wherein an electronic control device is provided for controlling the engine which corresponds to an electronic control device of the real vehicle and the control device is linked to the test stand control device in order to be supplied with the measured values for measurable variables and the values as calculated in the first simulation model for non-measurable variables.

6. The test stand according to claim 5, wherein the control device is adaptive and the evaluation variable is used for adaptation.

7. A method for simulating the driving behavior of vehicles comprising the steps of:
   a) mounting a combustion engine of a vehicle on a test stand and coupling the combustion engine to an electronically controllable braking apparatus of the test stand;
   b) measuring a first set of variables on the test stand;
   c) calculating simulation values of variables which are representative of a driving state of the vehicle by using a first simulation model, said first simulation model calculates the reaction of the vehicle to the behavior of the engine;
   d) calculating at least one evaluation variable w on the basis of the first set of variables measured on the test stand and the simulation values calculated therefrom with the first simulation model;
   e) calculating higher-frequency changes of the variables of the first set which are measurable by a further simulation model using the first set of variables and the values calculated by the first simulation model;
   f) superimposing said measured variables of the first set and said higher-frequency changes of these variables; and
   g) using the superimposed values in the calculation of the evaluation variable w.

8. The method according to claim 7, wherein the simulation values which are calculated in the first simulation model on the basis of the values for measurable variables which are actually measured on the test are used to trigger the test stand, whereas the simulation values calculated in the further simulation model are used exclusively for the calculation of the evaluation variable in such a way that the values for measurable variables as measured on the test stand are superimposed with the calculated higher-frequency changes.

9. The method according to claim 7, wherein the combustion engine is controlled by an electronic control device which corresponds to an electronic control device of the vehicle and the control device is supplied with values for the first set of measurable variables as measured on the test stand and with the simulation values for non-measurable variables as calculated in the first simulation model.

10. The method according to claim 9, wherein the control device is adaptive and the evaluation variable w is used for the adaptation.

* * * * *